(12) United States Patent
Seger et al.

(10) Patent No.: US 8,490,776 B2
(45) Date of Patent: Jul. 23, 2013

(54) ARRANGEMENT AND METHOD FOR THE TRANSPORTATION AND SYNCHRONIZED DISTRIBUTION OF PACKING UNITS

(75) Inventors: Martin Seger, Neumarkt (DE); Emil Dirmeier, Wolkering (DE); Stefan Heigl, Aholfing (DE); Helmut Arold, Ansbach (DE); Ludwig Kaeufl, Wiesenfelden (DE)

(73) Assignee: Krones AG, Neutraubling (DE)

( * ) Notice: Subject to any disclaimer, the term of this patent is extended or adjusted under 35 U.S.C. 154(b) by 359 days.

(21) Appl. No.: 12/423,856

(22) Filed: Apr. 15, 2009

(65) Prior Publication Data

US 2009/0259334 A1 Oct. 15, 2009

(30) Foreign Application Priority Data

Apr. 15, 2008 (DE) .......................... 10 2008 019 081

(51) Int. Cl.
*B65G 47/26* (2006.01)
*B65G 47/71* (2006.01)
(52) U.S. Cl.
CPC ...................................... *B65G 47/71* (2013.01)
USPC ............ 198/442; 198/444; 198/448; 198/453
(58) Field of Classification Search
USPC .................. 198/454, 442, 836.3, 448, 836.4, 198/636
See application file for complete search history.

(56) References Cited

U.S. PATENT DOCUMENTS

| | | | | |
|---|---|---|---|---|
| 1,898,662 A | * | 2/1933 | Dawson et al. | 198/442 |
| 2,781,119 A | * | 2/1957 | Talbot et al. | 198/636 |
| 3,089,576 A | * | 5/1963 | Sauer et al. | 198/634 |
| 3,326,138 A | * | 6/1967 | Thomas et al. | 104/93 |
| 3,470,997 A | | 10/1969 | Trounce | |
| 3,505,774 A | * | 4/1970 | Gidge | 53/415 |
| 3,581,965 A | * | 6/1971 | Shaver, Jr. | 226/177 |
| 3,872,644 A | * | 3/1975 | Giraudi et al. | 53/52 |
| 4,173,276 A | | 11/1979 | Raudat et al. | |
| 4,236,625 A | * | 12/1980 | Smith et al. | 198/454 |
| 4,302,919 A | | 12/1981 | Hartness | |
| 4,741,429 A | * | 5/1988 | Hattori et al. | 198/456 |
| 4,805,760 A | | 2/1989 | Treiber | |
| 5,101,959 A | * | 4/1992 | Whitby | 198/456 |
| 5,382,154 A | | 1/1995 | Morikawa et al. | |
| 7,165,667 B2 | | 1/2007 | Boecker et al. | |
| 2006/0163043 A1 | * | 7/2006 | Ranger | 198/861.1 |
| 2008/0099311 A1 | * | 5/2008 | Hartness et al. | 198/836.3 |

FOREIGN PATENT DOCUMENTS

| | | |
|---|---|---|
| DE | 197 51 967 A1 | 6/1999 |
| EP | 0 619 251 A1 | 10/1994 |
| JP | 55072814 A | 6/1980 |
| WO | WO 2006/041298 A2 | 4/2006 |

* cited by examiner

*Primary Examiner* — Gene Crawford
*Assistant Examiner* — William R Harp
(74) *Attorney, Agent, or Firm* — Simpson & Simpson, PLLC

(57) ABSTRACT

The invention relates to an arrangement and a method for the transportation and synchronous distribution of packaging units, wherein the packaging units are continuously supplied on a transportation apparatus and distributed to two further transportation apparatuses (16, 16'). The packaging units are centered on the first transportation apparatus by means of two flaps (20a, 20b) wherein, according to the present invention, the movement of the flaps is mechanically coupled.

7 Claims, 7 Drawing Sheets

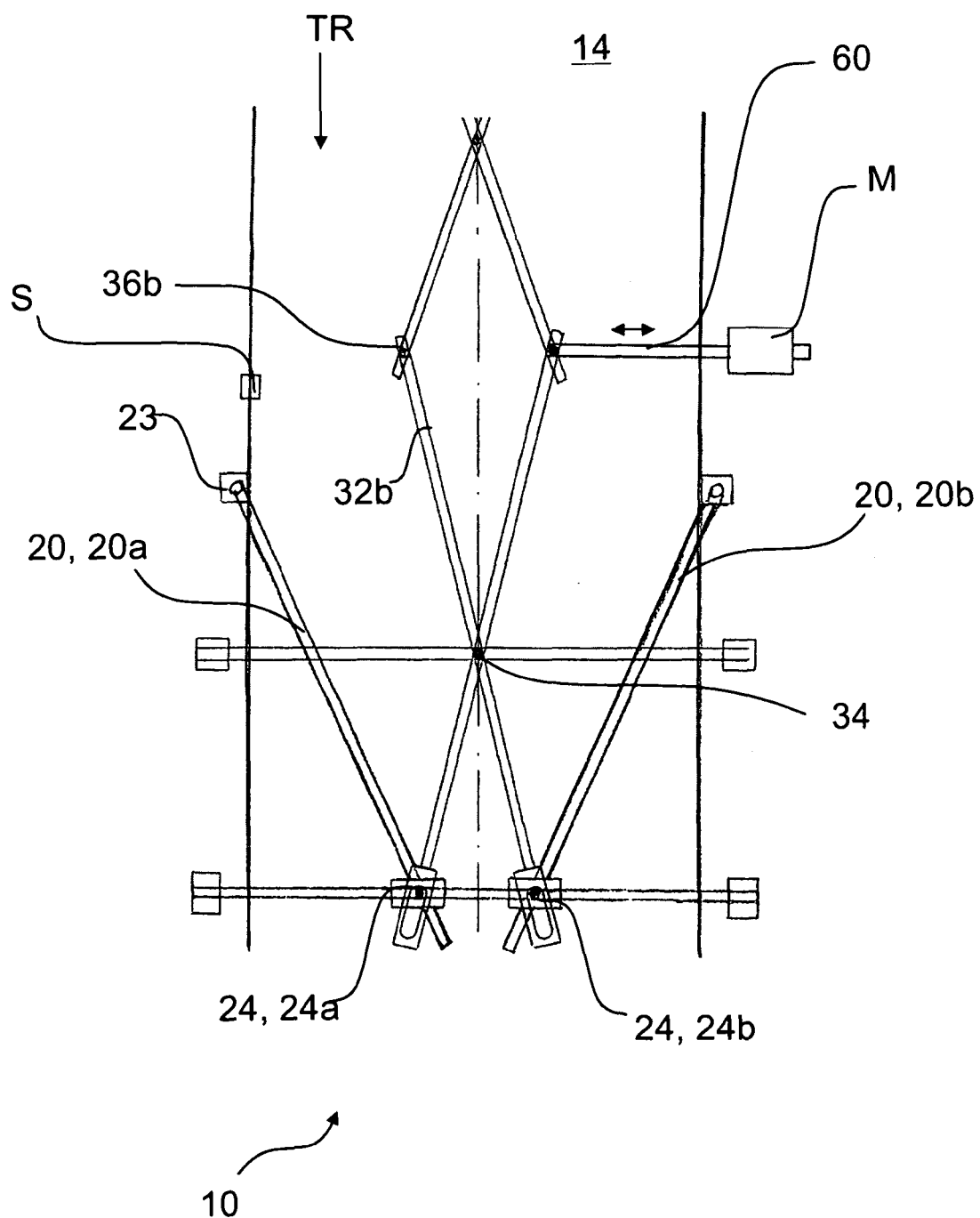

ARRANGEMENT AND METHOD FOR THE TRANSPORTATION AND SYNCHRONIZED DISTRIBUTION OF PACKING UNITS

CROSS REFERENCE TO RELATED APPLICATIONS

This patent application claims priority of German Patent Application No. DE 10 2008 019 081.0 filed on Apr. 15, 2008 which is incorporated herein by reference.

FIELD OF THE INVENTION

The invention relates to an arrangement for synchronous distribution of packaging units arriving on a transportation apparatus.

Additionally, the invention relates to a method for synchronous distribution of packaging units arriving on a transportation apparatus

BACKGROUND OF THE INVENTION

Distribution apparatuses are often used in bottle transportation and packaging technology. Before bottles are packaged to packing units, they are filled and subsequently fed to further packaging machines. Herein, the bottles are often fed to the subsequent machines via a transportation conveyor. Further processing is then often carried out in a parallel manner on a plurality of plants. This means that the incoming bottle flow has to be distributed to at least two further machines.

The cylindrical bottles arrive on the first transportation conveyor in irregular distribution. In the area upstream of the separation into two transportation conveyors the bottle flow is centered on the conveyor. Centering is carried out by means of two pivotable flaps. The thus centered bottles can thus be distributed as statistically, i.e. uniformly as possible to the two subsequent transportation conveyors.

The prior art centering flaps are biased by means of springs. This is how the flaps are moveable so that different container flow widths can be handled. Different container flow widths can arise, for example, due to a tailback where the incoming bottles accumulate.

Problems can arise if more bottles impinge on one flap than on the other. The flap on which more bottles impinge opens wider so that the passage is decentrally arranged which leads to non-uniform displacement and therefore to non-uniform distribution of the container flow to the downstream conveyors.

SUMMARY OF THE INVENTION

This has a direct negative effect on the subsequent machines which can no longer operate in a synchronous fashion. It is therefore the object of the present invention to create an arrangement enabling transportation and uniform distribution of packaging units from one transportation apparatus to two subsequent transportation apparatuses.

This object of the invention is achieved by an arrangement for the transportation and synchronous distribution of packaging units, comprising: a first transportation apparatus branching out into two further transportation apparatuses in a transporting direction; at least two flaps being mechanically coupled with each other, wherein the at least two flaps are associated with the first transporting apparatus and being pivotable about a vertical axis for centering the packaging units on a transportation conveyor of the first transportation apparatus.

It is a further object of the invention to provide a method, wherein uniform distribution of packaging units is carried out from a first transportation apparatus to two subsequent ones.

This object is achieved by a method for the transportation and synchronous distribution of packaging units comprising the steps of:
  supplying packaging units continuously on a transportation apparatus
  distributing the packaging units to two further transportation apparatuses,
  centering the packaging units on the first transportation apparatus by means of at least two flaps by carrying out a mechanically coupled movement of the at least two flaps.

An arrangement according to the present invention for the transportation and synchronous distribution of packaging units, in particular liquid containers, such as bottles, cans etc., but also of other containers, such as cartons and the like, comprises a first transportation apparatus branching out into at least two transportation apparatuses in the transporting direction. The transportation apparatuses are preferably transportation or conveyor belts. Preferably, such an arrangement is used for the synchronous distribution of cylindrical bottles.

On the first transportation apparatus, the packaging units are supplied in a steadily incoming flow and centered by the so-called centering flaps on the first transportation conveyor, so that they can be uniformly distributed to the subsequent transportation conveyors.

According to the present invention, a mechanically coupled movement of the flaps is carried out so that the forces exerted by the incoming packaging units are distributed to the two centering flaps in a uniform manner ensuring that a perfectly central passage is created. The bottles are thus uniformly centered so that uniform distribution to the two subsequent conveyors is carried out and non-uniform flap displacement is avoided.

In particular, the movement of the two flaps is in opposition. This means that the movement of the two centering flaps is coupled in such a way that they always have the same opening angle with respect to the center of the first transportation conveyor.

According to a preferred embodiment, a mechanical coupling of flap movement is achieved with the aid of at least one pantograph arrangement. The pantograph arrangement consists of pantograph arms rotatably or pivotably moveable on the flaps by means of connecting and guiding elements and resulting in a coordinated movement of the two flaps via a connecting spring.

Herein, the movement of one flap is transferred by means of the pantograph arms of the pantograph arrangement and by means of a tensile spring between the pantograph arms, directly onto the other flap which then carries out the same movement. The spring is in particular for resetting the movement of the pantograph arms into the rest position.

If more packaging units arrive on one flap, this will directly lead to increased pressure on this flap. The flap opens which leads to a displacement of the pantograph arm. This movement is directly transmitted to the other pantograph arm and due to the spring coupling directly onto the other flap which also opens in a corresponding manner. The result is a precisely centered through passage, and an exact distribution of the packaging units to the subsequent transportation conveyors is possible.

According to a further preferred embodiment, the controlled synchronous movement of the pantograph arms, and therefore the flaps, is caused by a linear drive or a rotary drive such as an electric motor, a pneumatic cylinder or the like coupled to the pantograph arms. At least one sensor arranged on the transportation conveyor senses the incoming container flow or container throughput, i.e. in particular the volume of packaging units arriving per time unit, the distribution of the same on the conveyor and further parameters, as the case may be. The values obtained by sensor detection are passed on to an evaluating unit which determines the required width of passage from the parameters and drives the motor on the basis of the calculated result.

According to a further embodiment, the pantograph structure can be coupled to a lifting or thrusting element. The lifting or thrusting element is moved by a motor according to the container flow determined by sensor detection. The movement is transferred to the flaps via the pantograph arms so that they can be synchronously opened or closed.

BRIEF DESCRIPTION OF THE DRAWINGS

Further features, objects and advantages of the present invention can be derived from the following detailed description of a preferred embodiment of the invention serving as a non-limiting example and referring to the accompanying drawings. The same components have the same reference numerals throughout and are not always repeatedly explained.

FIG. 3 is a top view of an apparatus for synchronous distribution, wherein displacement of the centering flaps is carried out by means of a motor or a pneumatic cylinder;

DETAILED DESCRIPTION OF THE INVENTION

Figure 2A:
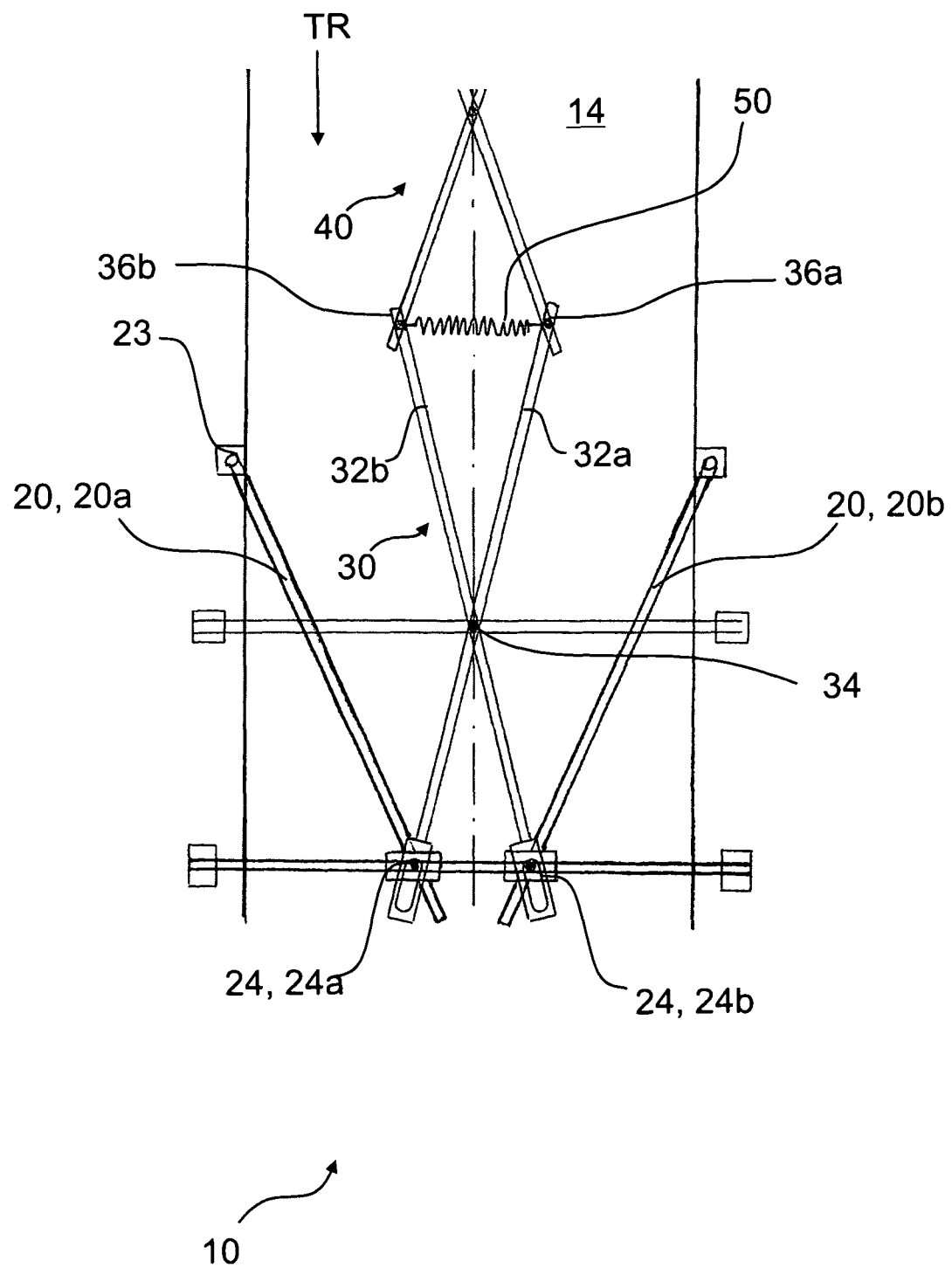
FIG. 2a is a top view of an apparatus for synchronous distribution, wherein the centering flaps are coupled by means of a pantograph arrangement.

An apparatus for synchronous control or centering arrangement 10 is shown in FIG. 2a.

Figure 1:
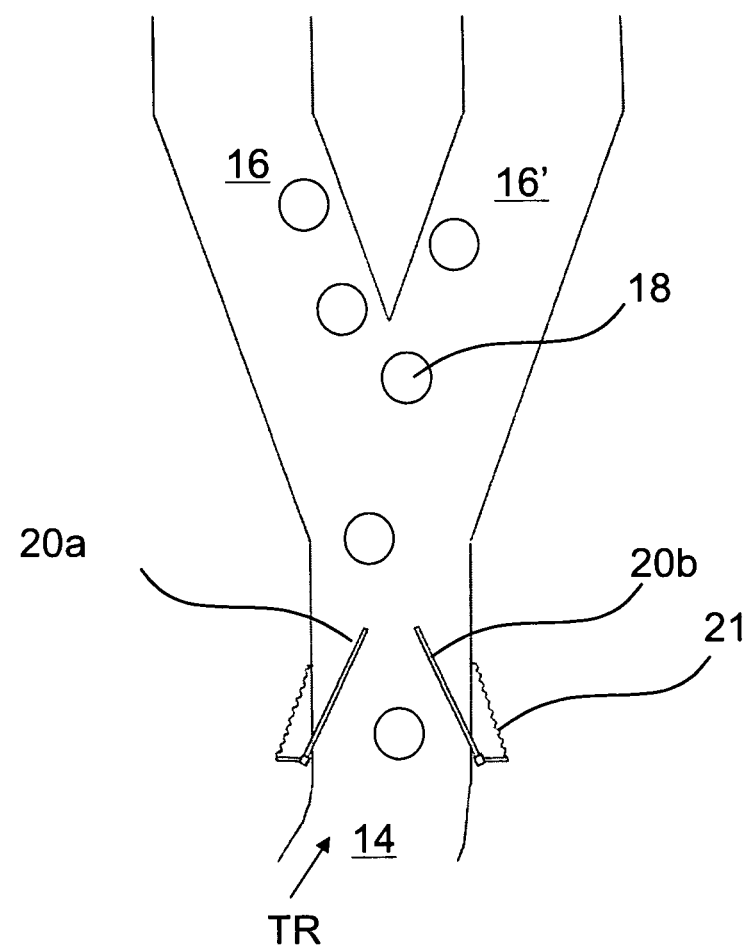
FIG. 1 shows the prior art for synchronous distribution with spring-biased centering flaps.

The prior art is shown in FIG. 1. Cylindrical bottles 18 individually arrive on a first transportation conveyor 14 in transportation direction TR in irregular intervals and in irregular distribution. In the area upstream of the distribution to two transportation conveyors 16, 16', the bottle flow is centered on the conveyor. Centering is achieved by means of two flaps 20a, 20b stationary and pivotably moveable on the side of transportation conveyor 14 and which can be preadjusted as a function of the size of the liquid containers. The bottles and the bottle flow are thus centered on the conveyor and can be distributed as statistically or uniformly as possible to the two subsequent transportation belts or conveyors 16, 16'.

Centering flaps 20a, 20b are biased by means of springs 21 according to the state of the art. This is necessary since flaps 20a, 20b must be moveable to be able to respond to different container flow widths. These different container flow widths can arise due to a tailback, for example, where the incoming bottles accumulate.

Resetting of flaps 20a, 20b in the preset rest position is effected by a tensile spring 21. If more bottles arrive at flaps 20a, 20b within the same time, the pressure on flaps 20a, 20b is increased and they are opened to enable more packaging units to pass through the opening and be distributed to the two subsequent conveyors 16, 16'.

This can lead to a problem that due to the side rail arrangement in transportation conveyor 14 preferably more bottles arrive on flap 20a, for example, i.e. the arrival of bottles is preferably on this side. This has the effect that higher pressure is exerted on this flap 20a. The pressure on flap 20b is lower, however, due to the lower number of bottles so that it is opened to a lesser extent or not at all. There is thus a risk that the opening preset by flaps 20a, 20b is moved off center which changes the distribution to the two subsequent conveyors 16, 16' and there is no longer a statistical 50:50 distribution.

Further interfering factors which can cause uneven opening of the flaps can be, for example, different degrees of bearing friction and a different spring force of the tensile springs on flaps 20a and 20b. These and other interfering factors have an immediate effect on subsequent machines since they are no longer able to operate in a synchronous fashion.

Figure 2B:
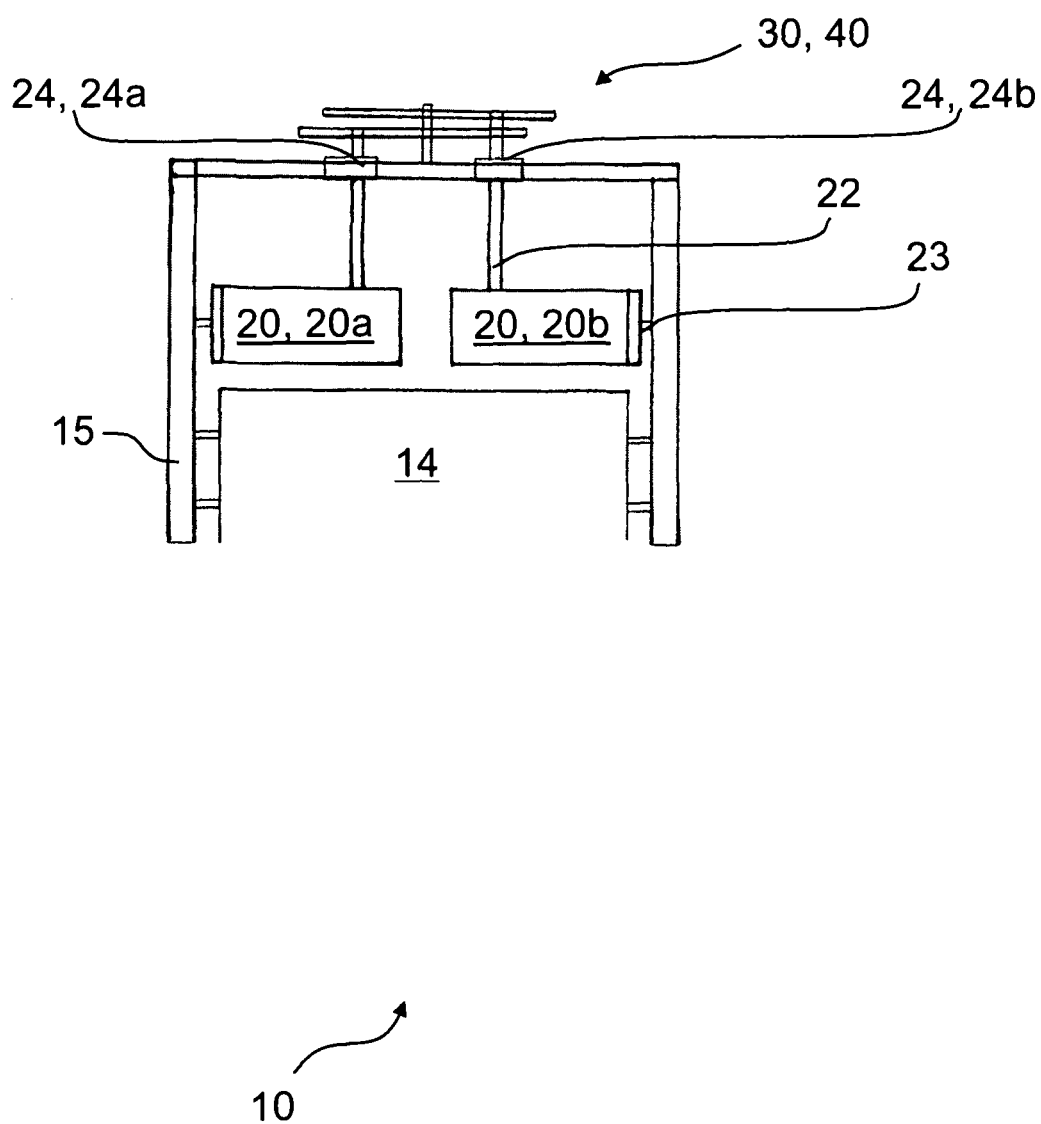
FIG. 2b is a front view of an apparatus for synchronous distribution with coupling of the flaps by means of a pantograph arrangement.

FIGS. 2a and 2b show a so-called pantograph arrangement 30 for synchronous control of the two flaps 20a, 20b. Centering flaps 20a, 20b are pivotably mounted on a frame construction 15 serving as a base frame for mounting all further elements of arrangement 10. The two flaps 20a, 20b are each supported on guide 24a, 24b arranged above the transportation conveyor by means of respective connecting elements 22a, 22b. A pantograph arrangement 30 is further mounted on guide 24a, 24b, in such a way, that a movement of one of flaps 20a, 20b is directly transferred to pantograph arrangement 30.

Pantograph arrangement 30 consists of two pantograph arms 32a, 32b rotatably coupled with each other at an intersection point or support 34. Pantograph arms 32a, 32b are intersected at support 34 in such a way that each section has exactly the same length between guiding point 24a and support point 34 or between guiding point 24b and support point 34. The same is true for the sections between support point 34 and end points 36a and 36b. Pantograph arms 32a, 32b are coupled to a further pantograph structure 40 at their ends 36a, 36b facing away from guides 24a, 24b. Additional coupling is by means of a spring 50.

This arrangement has the effect that increased pressure on one of the two flaps 20a, 20b has a direct effect on the other flap 20a, 20b due to mechanical coupling.

If, for example, flap 20a is urged to the edge of the conveyor belt by increased bottle pressure, this will cause pantograph arm 32a to be displaced via guide 24a. This movement will be directly transmitted due to the rotational support at support point 34 and the connection with a further pantograph structure 40 and spring 50 via pantograph arm 32b to flap 20b, which will open toward the edge in a corresponding manner.

In this way, there will always be an absolutely central alignment of the passageway which in turn leads to a precise distribution of the packaging units to the downstream transportation conveyors.

FIG. 3 shows an apparatus for synchronous distribution wherein the incoming packaging units are sensed by sensor detection. This can be at least a single sensor S in a single place. According to a further embodiment, the use of a series of sensors is provided arranged transverse to the transporting direction. Sensors S determine, for example, the volume, position etc. of the incoming packaging units and transmit this to a computing unit or the like, which directly evaluates these results and transmits them to a control, which, in turn, drives a motor M. Motor M can be, for example, a motor with interior threaded hollow shaft 60, wherein motor M is coupled to pantograph structures 30, 40 by means of a hollow shaft 60. On the basis of pantograph structure arrangements 30, 40 described with reference to FIG. 2, a synchronous adjustment of coupled flaps 20a, 20b is carried out by means of the motor.

Figure 4:
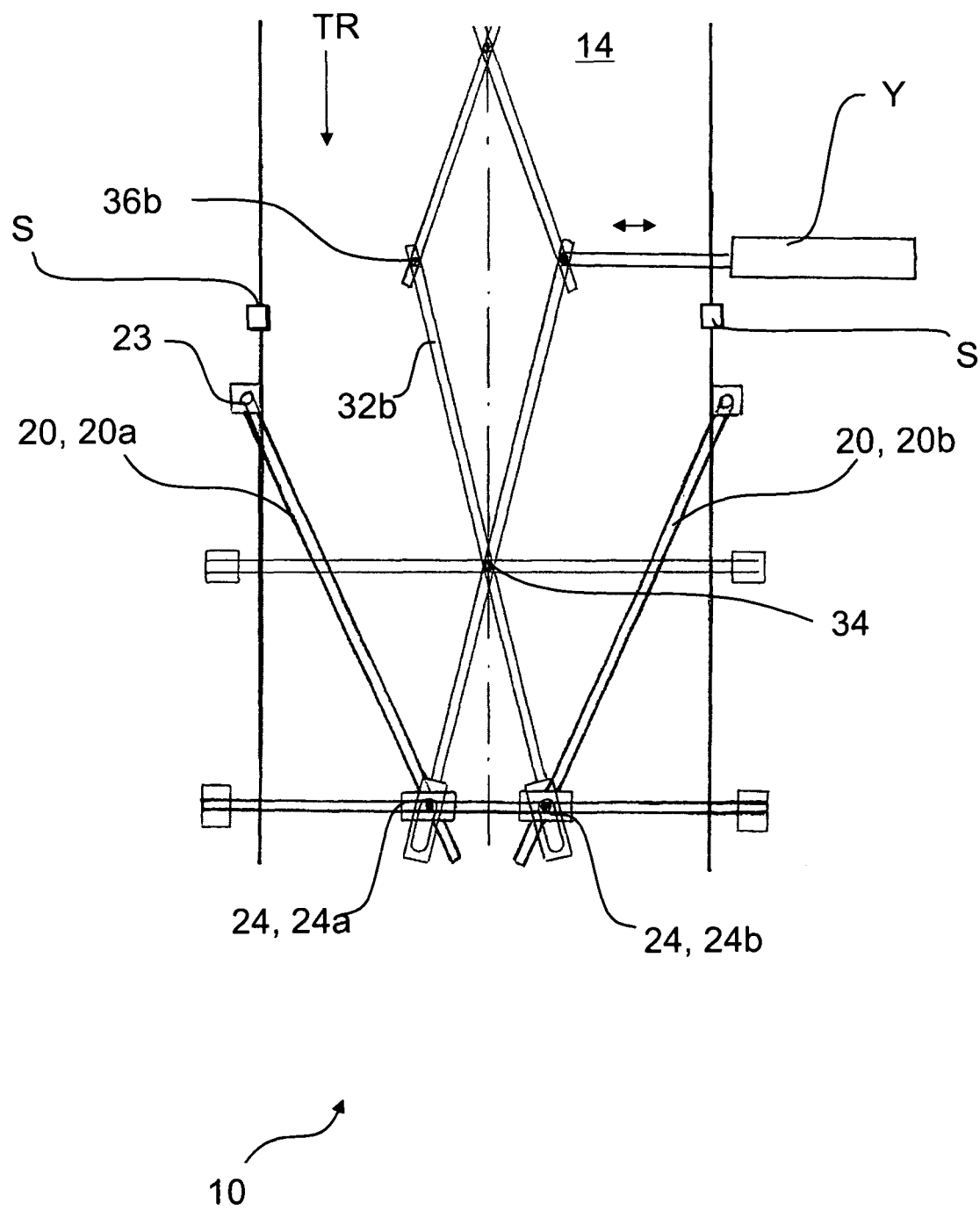
FIG. 4 is a top view of an apparatus for synchronous distribution with a pantograph arrangement driven by a pneumatic cylinder for coupling the flaps.

FIG. 4 shows a further alternative embodiment substantially corresponding to the embodiment of FIG. 3, wherein, instead of motor M, a pneumatic cylinder Y can be used for adjusting flaps 20a, 20b. In this exemplary embodiment, two sensors arranged on opposite sides of the transportation conveyor are shown for detecting the throughput of packaging units.

Figure 5:
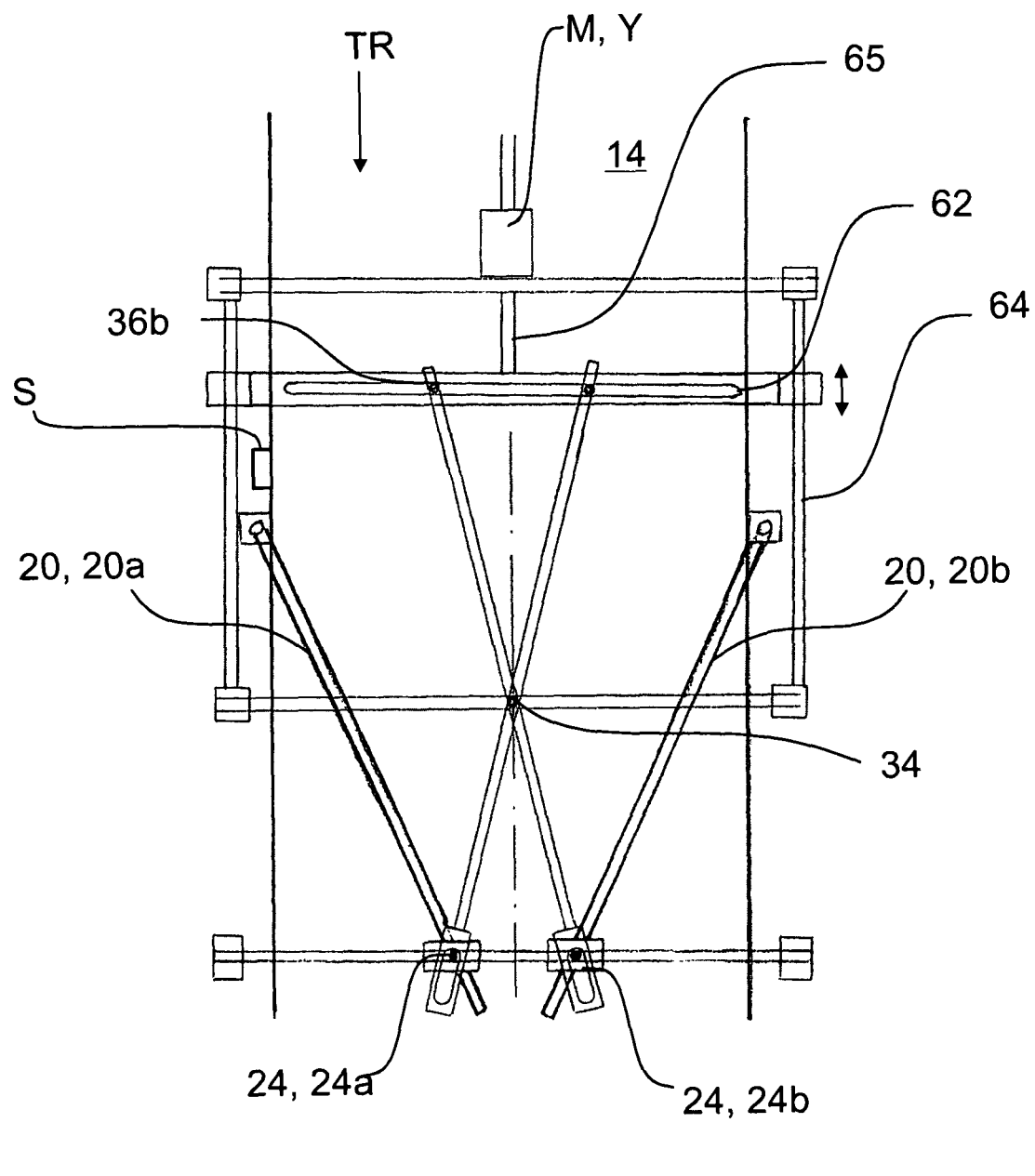
FIG. 5 is a top view of an apparatus for synchronous distribution with a thrusting element and a pantograph arrangement for coupling the flaps.

FIG. 5 shows the use of a thrusting element 62. The latter is arranged on end points 26a, 26b of pantograph arms 32a, 32b, instead of second pantograph arrangement 40 and spring 50, motor M or pneumatic cylinder Y. Thrusting element 62 has an elongate through-hole, for example, in which end sections 36a, 36b of pantograph arms 32a, 32b are guided in a moveable manner. Thrusting element 62 is additionally securely guided in lateral guides 64, arranged at an angle of 90° to the above mentioned elongate through-hole. In this manner, jamming is avoided and synchronous opening of flaps 20a, 20b is enabled. Thrusting element 62 is connected with a motor M or a pneumatic cylinder Y or the like via a further connecting element 65. Again, the arrangement has at least one sensor S for determining the bottle flow, on the basis of which motor M or pneumatic cylinder Y are correspondingly adjusted and opening of the flaps is correspondingly regulated.

Figure 6:
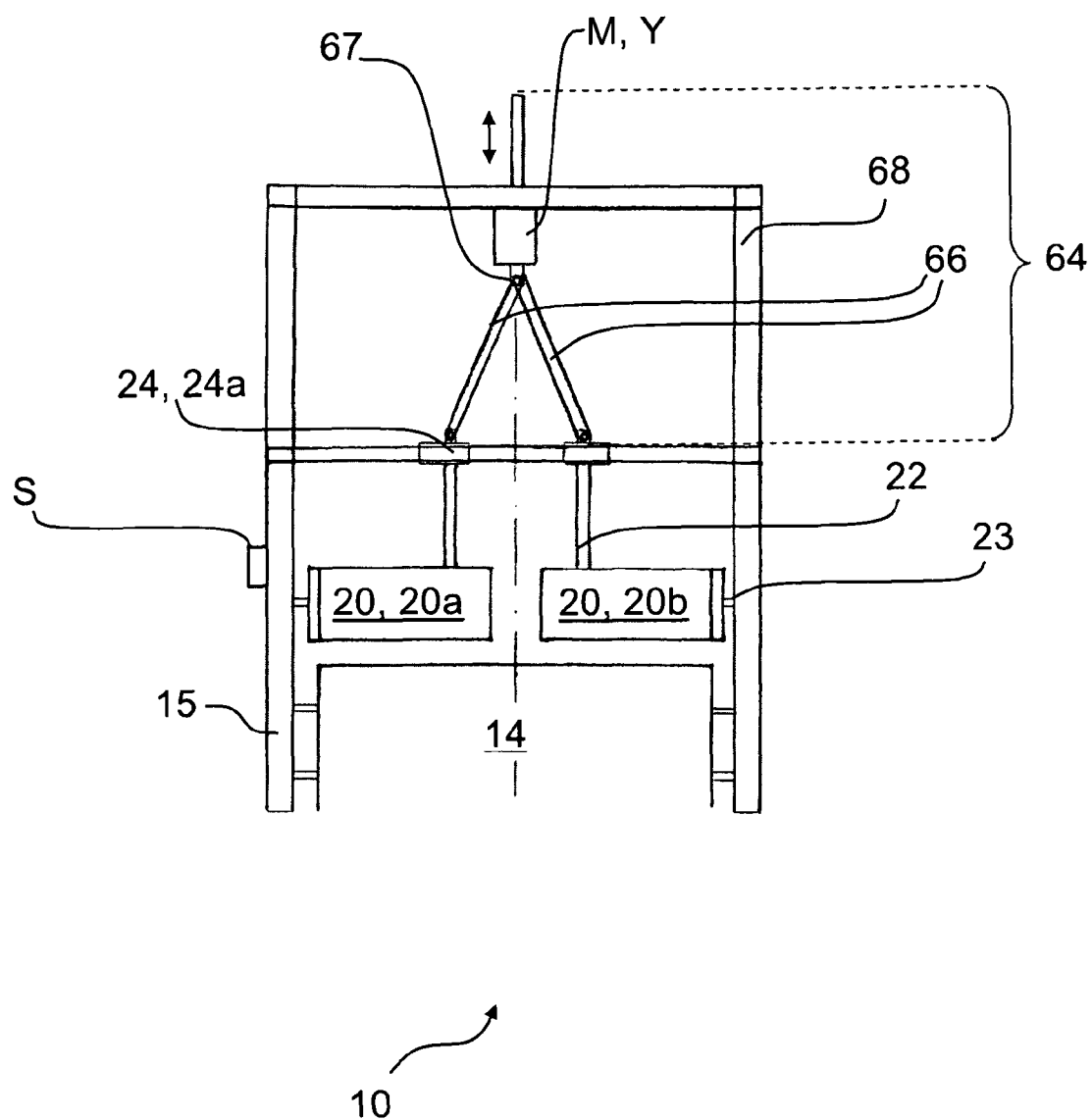
FIG. 6 shows an apparatus for synchronous distribution with a partial pantograph arrangement, and coupling of the flaps by means of a vertically moveable thrusting or lifting element.

FIG. 6 shows an upright symmetrical arrangement for synchronized, coupled movement of centering flaps 20a, 20b by means of a lifting apparatus 64. Centering flaps 20a, 20b are equipped with connecting elements 22 extending upwardly, away from the transportation conveyor, supported on guides 24a, 24b. To these guides 24a, 24b, two further connecting elements 66 of the same length are attached, which are centrally connected to each other in a rotary fashion above the two flaps and are connected via a shaft, for example, with a motor M or a pneumatic cylinder Y in their connecting point 67, and can be moved thereby. Motor M or pneumatic cylinder Y, in turn, will be driven on the basis of a signal established by sensor detection in response to the volume of bottles. By pressing to the bottom, centering flaps 20a, 20b are opened, while by pulling up and thereby closing the centering flaps 20a, 20b the passageway is reduced.

What is claimed is:

1. An arrangement for the transportation and synchronous distribution of a plurality of individual bottles and cans, comprising:
    a first transportation apparatus including a transportation conveyor branching out into a second transportation apparatus and a third transportation apparatus in a transporting direction;
    at least two flaps being mechanically coupled with each other, wherein the at least two flaps are associated with the first transporting apparatus and being pivotable about a vertical axis for centering the plurality of individual bottles and cans on the transportation conveyor of the first transportation apparatus, wherein each of said plurality of individual bottles and cans arrives at said at least two flaps in irregular intervals and in irregular distribution;
    at least one pantograph arrangement having pantograph arms for coupling the flaps;
    a linear drive or rotary drive motor for the controlled, synchronous movement of the pantograph arms in an opposite direction during the operation of the transportation conveyor;
    a sensor, said sensor measuring the rate of flow of said plurality of individual bottles and cans when said rate of flow is greater than zero;
    and a computing unit;
    wherein the at least two flaps form a passage for the plurality of individual bottles and cans;
    wherein the width of the passage is computed by the computing unit from the parameters detected by the sensor; and,
    wherein the width of the passage is adjusted by the linear or rotary drive.

2. The arrangement according to claim 1 further comprising a spring, wherein the spring is provided with the arrangement for resetting a movement to a rest position of the pantograph arms of the pantograph arrangement.

3. The arrangement according to claim 1, wherein the arrangement has a thrusting element or a lifting element for coupling the flaps.

4. A method for the transportation and synchronous distribution of a plurality of individual bottles and cans comprising the steps of:
    supplying said plurality of individual bottles and cans continuously on a first transportation apparatus, wherein said plurality of individual bottles and cans is supplied in irregular intervals and in irregular distribution;
    distributing bottles and cans to one of a second or third transportation apparatus;
    centering the bottles and cans on the first transportation apparatus by means of at least two flaps by carrying out a mechanically coupled movement of the at least two flaps wherein the at least two flaps are coupled by pantograph arms of a pantograph arrangement;
    determining the rate of flow of said incoming plurality of individual bottles and cans on the first transportation conveyor when said rate of flow is greater than zero;
    transmitting said determined rate of flow to a computing unit;
    computing the required width of a passage formed by said at least two flaps by said computing unit; and,
    synchronously controlling the mechanically coupled movement of the pantograph arms by using a motor during the continuous supplying of said plurality of individual bottles and cans;
    wherein said rate of flow determination is realized with a sensor; and,
    wherein the synchronous control of the mechanically coupled movement is achieved by movement of the at least two flaps coupled to the pantograph arms in an opposite direction after the computation by said computing unit.

5. The method according to claim 4, further comprising resetting of the movement of the pantograph arms of the pantograph arrangement into a rest position, wherein said resetting is performed with a spring.

6. The method according to claim 4, wherein the movement of the pantograph arms is controlled on the basis of the flow of the packaging units as determined by means of the sensor.

7. The method according to claim 4, wherein the motor moves as one of a thrusting element or a lifting element, wherein said movement of said thrusting element or said lifting element causes the movement of pantograph arms and therefore a synchronized movement of the centering flaps.

* * * * *